US010431978B2

(12) United States Patent
Tao et al.

(10) Patent No.: US 10,431,978 B2
(45) Date of Patent: *Oct. 1, 2019

(54) SYSTEM AND METHOD FOR HYBRID ENERGY CONVERSION

(71) Applicant: General Electric Company, Schenectady, NY (US)

(72) Inventors: Fengfeng Tao, Niskayuna, NY (US); Ahmed Elasser, Latham, NY (US); Song Chi, Clifton Park, NY (US); Maja Harfman Todorovic, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/673,520

(22) Filed: Aug. 10, 2017

(65) Prior Publication Data
US 2017/0366006 A1    Dec. 21, 2017

Related U.S. Application Data

(63) Continuation of application No. 14/262,144, filed on Apr. 25, 2014, now Pat. No. 9,748,767.

(51) Int. Cl.
| | |
|---|---|
| *H02J 1/10* | (2006.01) |
| *H02J 7/35* | (2006.01) |
| *H02J 9/06* | (2006.01) |
| *H02J 3/38* | (2006.01) |

(52) U.S. Cl.
CPC ............ *H02J 1/102* (2013.01); *H02J 3/383* (2013.01); *H02J 7/35* (2013.01); *H02J 9/061* (2013.01); *Y02B 10/72* (2013.01); *Y02E 10/563* (2013.01); *Y02E 10/566* (2013.01)

(58) Field of Classification Search
CPC .... H02J 1/102; H02J 3/383; H02J 7/35; H02J 9/061; Y02B 10/72; Y02E 10/563; Y02E 10/566
USPC .......................................................... 307/82
See application file for complete search history.

(56) References Cited

U.S. PATENT DOCUMENTS

| 2005/0078491 A1 | 4/2005 | Song et al. |
| 2011/0006600 A1 | 1/2011 | Fontana et al. |

OTHER PUBLICATIONS

Kheraluwala et al., "A Fast-Response High Power Factor Converter with a Single Power Stage," 22nd Annual IEEE Power Electronics Specialists Conference, 1991, pp. 769-779.

*Primary Examiner* — Carlos Amaya
(74) *Attorney, Agent, or Firm* — Ziolkowski Patent Solutions Group, SC; Jean K. Testa

(57) ABSTRACT

A system and method for conditioning DC power received from hybrid DC power sources is disclosed. A power conversion circuit is coupled to a respective DC power source to selectively condition the output power generated thereby to a DC bus voltage. The power conversion circuit includes a switch arrangement and capacitors arranged to provide a charge balancing in the power conversion circuit. A controller in operable communication with the switch arrangement receives inputs on a DC bus voltage and at least one parameter related to operation of the DC power source, and determines an adjustable voltage to be output from the conversion circuit to the DC bus based on the received inputs. The controller then selectively controls operation of the switch arrangement in order to generate the determined adjustable voltage.

20 Claims, 5 Drawing Sheets

SYSTEM AND METHOD FOR HYBRID ENERGY CONVERSION

CROSS-REFERENCE TO RELATED APPLICATION

The present application is a continuation of, and claims priority to, U.S. patent application Ser. No. 14/262,144, filed Apr. 25, 2014, the disclosure of which is incorporated herein by reference in its entirety.

BACKGROUND OF THE INVENTION

Embodiments of the invention relate generally to electronic power conversion and, more particularly, to a system and method for performing a power conversion on the power output from hybrid DC energy sources, such as a photovoltaic (PV) module and a battery, that allows for the output of the two DC sources to connect to a common DC distribution system.

In industry, it is becoming increasingly common for varying types of energy or power sources to be employed in combination with one another for purposes of power generation and/or distribution. One common example is the use of photovoltaic (PV) systems in combination with DC batteries. PV systems include PV modules arranged in arrays that generate direct current (DC) power, with the magnitude of DC current being dependent on solar irradiation and the magnitude of DC voltage dependent on ambient and solar cell temperature. The use of DC batteries in conjunction with PV systems is often desirable, as the DC batteries provide for energy storage that allows for a number of features that enhance power system operation and enable higher penetration of solar power, while providing a backup source of power during times when solar irradiation is low or absent (e.g., at night).

However, it is recognized that systems that incorporate both PV systems and DC batteries face restrictions with respect to sharing of the DC power—as such sharing of DC power on a common DC bus may not be possible due to the mismatch of the operating voltage between the batteries and the PV systems. That is, for PV systems and batteries—as well as with combinations of other alternative power sources—the power source terminal characteristics such as voltage, current, power flow direction, etc., will often vary greatly. While the use of separate specialized voltage converters with each power source may help address the discrepancies in terminal characteristics between the power sources, the use of such converters can add to the overall cost and complexity of the power system and may affect its reliability.

Therefore, it would be desirable to provide a system and a method that enables the use of a mix of different energy sources (i.e., a hybrid energy system) and that links those energy sources for use in a common system. Such a system and method should provide standardized and flexible conversion or interface circuits to link those energy sources, so as to provide flexible, highly efficient, bi-directional power flow at a lower cost.

BRIEF DESCRIPTION OF THE INVENTION

In accordance with one aspect of the invention, a DC power distribution system includes a DC bus and a plurality of DC power sources connected to the DC bus each configured to generate an output power for transmission to the DC bus, wherein the plurality of DC power sources include at least two different types of DC power sources having differing voltage terminal output characteristics. The DC power distribution system also includes a power conversion circuit coupled to each of the plurality of DC power sources to selectively condition the output power generated by its respective DC power source to a DC bus voltage, with each power conversion circuit having a standardized construction so as to be identical to each of the other power conversion circuits. Each power conversion circuit further comprises a switch arrangement comprising a plurality of switches operable in an open state and a closed state, a plurality of capacitors arranged to provide a charge balancing in the power conversion circuit, the plurality of capacitors including a DC link capacitor, and a controller in operable communication with the switch arrangement, the controller being programmed to receive a first input comprising a DC bus voltage present on the DC bus, receive a second input comprising at least one parameter related to operation of the DC power source to which the respective power conversion circuit is coupled, determine an adjustable voltage to be output from the conversion circuit to the DC bus based on the received first and second inputs, and selectively control operation of each of the plurality of switches in the switch arrangement in order to generate the determined adjustable voltage.

In accordance with another aspect of the invention, a method of conditioning an output power of hybrid DC power sources in a power distribution system includes generating a first output power from a first DC power source and generating a second output power from a second DC power source, the second DC power source being a different power source than the first DC power source such that the second output power has a different voltage characteristic than the first output power. The method also includes performing a voltage conversion of the first output power by way of a first conversion circuit so as to generate a first modified voltage and performing a voltage conversion of the second output power by way of a second conversion circuit so as to generate a second modified voltage, the second conversion circuit having an identical construction as the first conversion circuit. The method further includes providing the first and second modified voltages to a common DC bus to which the first and second DC power sources and first and second conversion circuits are electrically coupled, wherein performing the voltage conversion of the first and second output powers by way of the first and second conversion circuits each further comprises receiving a first input comprising a DC bus voltage present on the DC bus, receiving a second input comprising at least one parameter related to operation of the DC power source to which the respective power conversion circuit is coupled, determining a modified voltage to be output from the conversion circuit to the DC bus based on the received first and second inputs, and controlling operation of the respective conversion circuit in order to generate the determined modified voltage.

In accordance with yet another aspect of the invention, a DC power distribution system includes a DC bus and a plurality of DC power sources connected to the DC bus and configured to generate an output power for transmission to the DC bus, wherein the plurality of DC power sources include at least two different types of DC power sources having differing voltage terminal output characteristics. The DC power distribution system also includes a voltage conversion circuit operatively coupled to each of the plurality of DC power sources to selectively condition the DC power generated by its respective DC power source or condition a DC power provided to its respective DC power source to provide recharging thereto. Each of the voltage conversion circuits has an identical construction and further includes a switch arrangement comprising a plurality of switches operable in an open state and a closed state, a plurality of capacitors arranged to provide a charge balancing in the power conversion circuit, the plurality of capacitors including a DC link capacitor, and a controller in operable communication with the switch arrangement. The controller is programmed to receive a first input comprising a DC bus voltage present on the DC bus, receive a second input comprising at least one parameter related to operation of the DC power source to which the respective power conversion circuit is coupled, and determine an adjustable voltage to be output from the conversion circuit to the DC bus or to the DC power source based on the received first and second inputs, the adjustable voltage comprising a positive or negative voltage of desired magnitude. The controller is further programmed to selectively control operation of each of the plurality of switches in the switch arrangement in order to generate the determined adjustable voltage.

These and other advantages and features will be more readily understood from the following detailed description of preferred embodiments of the invention that is provided in connection with the accompanying drawings.

BRIEF DESCRIPTION OF THE DRAWINGS

The drawings illustrate embodiments presently contemplated for carrying out the invention.

In the drawings.

DETAILED DESCRIPTION

Embodiments of the invention are directed to a DC power distribution system having different or "hybrid" DC power sources connected to a common DC bus. Each DC power source in the system is connected to a voltage conversion circuit that is configured to condition the DC power received from its respective power source in order to output a voltage to the DC bus having a desired magnitude and direction (i.e., positive/negative voltage).

Figure 1:
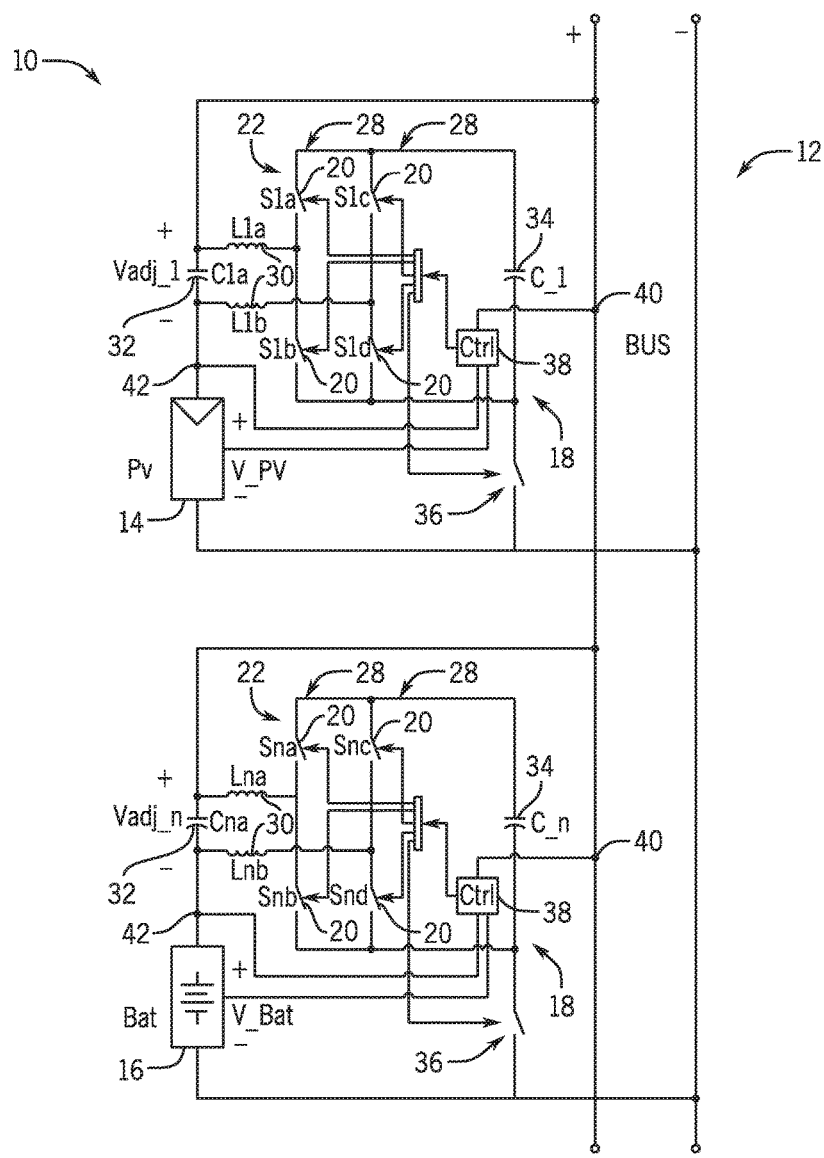
FIG. 1 is a schematic diagram of a DC power distribution system including voltage conversion circuits, according to an embodiment of the invention.

Referring to FIG. 1, the general structure of a DC power distribution system 10 is shown according to an embodiment of the invention. DC power distribution system 10 includes a plurality of power sources therein that are connected to a common DC power bus 12. In the embodiment shown in FIG. 1, a pair of DC power sources 14, 16 is shown as being included in the power distribution system in the form of a photovoltaic (PV) array assembly and a battery. It is recognized, however, that a greater number of power sources of various types may be included in the DC power distribution system 10, according to embodiments of the invention, with such power sources being configured as PV array assemblies, batteries, fuel cells, ultra capacitors, or other known types of DC power sources.

Because terminal characteristics such as voltage, current, power flow direction, etc., are different for the PV array assembly 14 and the battery 16 (and for different energy sources in general), conditioning/converting of the power provided from each of the power sources must be performed in order to provide for connection of the power sources to a common DC bus 12. DC power distribution system 10 thus employs voltage conversion or interface circuits 18 to condition a DC voltage output received from a PV array assembly 14 and a DC voltage output received from a DC battery 16 to a desired DC bus voltage. As shown in FIG. 1, a conversion circuit 18 is provided for each power source 14, 16 and is electrically coupled thereto such that it can receive power from its respective source and condition the power so as to output a controlled adjustable voltage (i.e., modified voltage) to the DC bus 12. Beneficially, the structure of the conversion circuits 18 included in the system 24 are the same regardless of the type of power source to which they are connected—as opposed to being "specialized" conversion circuits that are of a specific type based on the type of power source to which they are connected, as is typically found in existing hybrid power systems. As the conversion circuits 18 are of a standardized construction, while still providing flexibility with respect to the power conversion performed thereby (i.e., output of an adjustable voltage), the construction of the power distribution system 10 can be simplified and costs associated therewith reduced.

The general structure of each conversion circuit 18 is shown in FIG. 1, according to an embodiment of the invention. The conversion circuit 18 includes a plurality of switches or switch modules 20—forming a switch arrangement/set 22—whose state can be selectively controlled to condition the DC power output of the PV array assembly 14 and/or battery 16 (i.e., the voltage of the output) to a controllable/adjustable DC bus voltage of desired direction and magnitude, identified as $V_{adj}$ in FIG. 1. That is, in operation, the switches 20 in each conversion circuit 18 function to selectively convert the output voltage provided from each of the power sources 14, 16 and regulate the output from the conversion circuits 18 to the DC bus 12, as described in more detail below.

Figure 2:
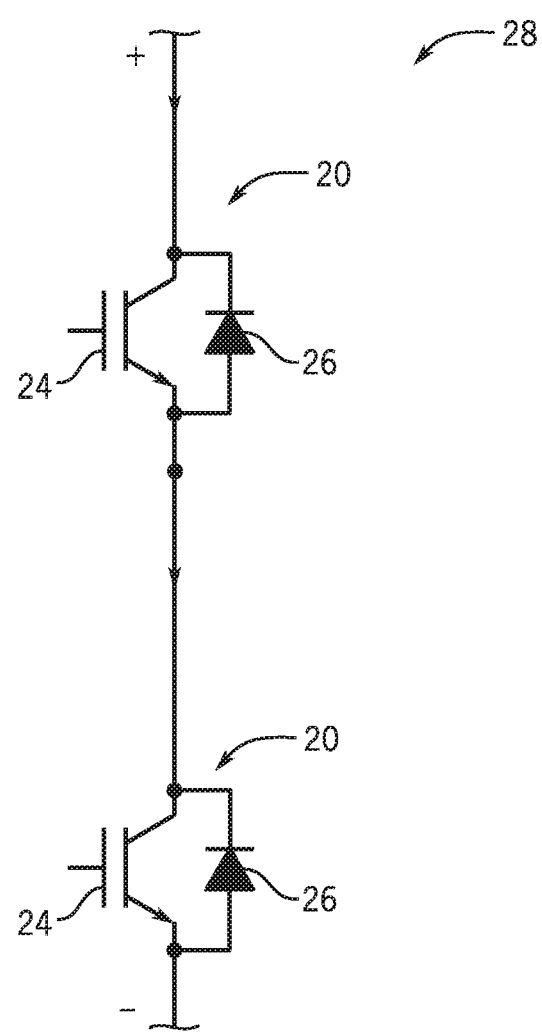
FIG. 2 is a circuit diagram of a switch module structure and half-bridge circuit topology for use with embodiments of the invention.

An exemplary topology/construction of the switches 20, and an arrangement thereof, is shown in more detail in FIG. 2. Each switch module is comprised of an electrical switch 24 and a diode 26. Electrical switches 24 are shown, for illustrative purposes, as insulated gate bipolar transistors (IGBTs), and diodes are shown as discrete ones. However, embodiments of the invention are not limited to IGBTs. Any appropriate electronic switch can be used, such as, for example, metal oxide semiconductor field effect transistors (MOSFETs) together with their parasitic body diodes, bipolar junction transistors (BJTs), and metal oxide semiconductor controlled thyristors (MCTs). The switches and diodes can be made with Silicon (Si), Silicon Carbide (SiC), Gallium Nitride (GaN), or any suitable Wide Bandgap (WBG) material. The switches 20 are arranged in a known half-bridge circuit topology 28 that serves as a fundamental building block for a power converter, with the switches 20 being controlled to provide a desired power conversion. The half-bridge circuit 28 may be used for one phase of a single- or multi-phase DC-to-DC converter, with the half-bridge circuit 28 being controlled to convert an input DC voltage to an output DC voltage having a desired positive or negative voltage of desired magnitude.

Referring back now to FIG. 1, each conversion circuit 18 also includes an inductor 30 coupled to a respective half-bridge circuit 28 (i.e., a pair of switches 20) to provide smoothing in the conversion circuit 18. Capacitors 32, 34 are further included in conversion circuit 18—in either a serial, parallel, or bypass arrangement—to provide circuit stability via charge balancing. That is, capacitors 32, 34 provide substantial capacitance to buffer energy in case of high frequency mismatch or imbalance of power between the DC power sources 14, 16 (e.g., the PV array assembly) and the DC bus 12.

According to one embodiment of the invention, an additional switch 36 (i.e., charging switch) is included in the conversion circuit 18 to provide for a selective connection of the DC bus 12 to the conversion circuit. Switch 36 may be selectively opened and closed during distinct operational modes of the conversion circuit 18 where the capacitor 34 is being charged or discharged—as will be explained in greater detail below. The switch 36 is in an OFF state when the capacitor 34 is being discharged and is in an ON state when the capacitor 34 is being charged. By operating the switch 36 in the ON state, the DC bus may be utilized to provide charging power to the capacitor 34, as will also be explained in greater detail below. According to embodiments of the invention, switch 36 may be implemented as a MOSFET or IGBT, for example, or any other appropriate electronic switch previously mentioned herein.

To control actuation/switching of switches 20 and the corresponding amount/level of voltage provided from the DC power sources 14, 16 to the DC bus 12, a controller 38 is provided in each conversion circuit 18 that is operationally coupled to the switch arrangement 22. The controller 38 functions to selectively control the state of each switch 20 (i.e., the ON-OFF switching/states) in order to control the output characteristic of the conversion circuit 18—with a positive or negative voltage of desired magnitude being selectively output from the conversion circuit 18. Controller 38 also controls the ON-OFF switching of charging switch 36.

In operation of conversion circuit 18, the controller 38 receives one or more inputs regarding operation of its respective DC power source 14, 16 and/or operation of the DC bus 12. With respect to the DC bus 12, the controller 38 may receive an input regarding the present DC bus voltage—such as from a voltage sensor 40 on DC bus 12—and/or an input regarding a desired DC bus voltage. With respect to the DC power source 14, 16 which the conversion circuit 18 and its respective controller 38 is operationally connected to, the controller 38 may receive an input regarding the output power (voltage and/or current) of the DC power source 14, 16—such as from voltage/current sensors 42—as well as an input regarding the type of DC power source to which the conversion circuit is coupled, such as whether the power source 14, 16 is a unidirectional or bidirectional power source, for example.

Figure 3:
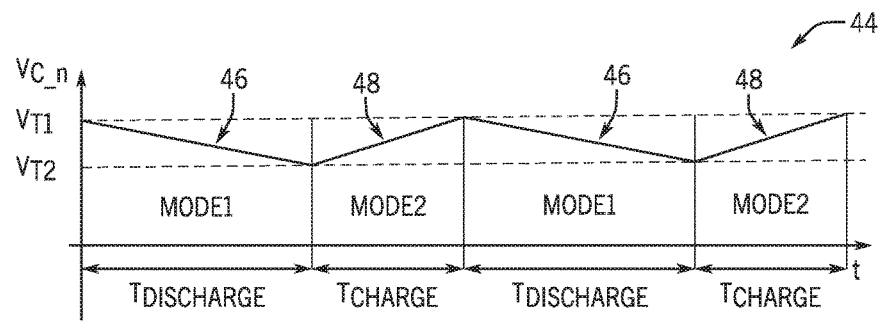
FIG. 3 illustrates a technique for selectively charging and discharging the DC link capacitor in the voltage conversion circuit of FIG. 1 when outputting power from the DC power source to the DC bus, according to an embodiment of the invention.

Referring now to FIG. 3, and with continued reference to FIG. 1, a technique 44 is provided—such as would be performed by controller 38—that illustrates the operation of the conversion circuit 18 in providing charge balancing, specifically with regard to the charging and discharging of capacitor 34 (i.e., the "DC link capacitor") to buffer energy in case of high frequency mismatch or imbalance of power between the DC power sources 14, 16 and the DC bus 12. When providing an output power from a DC power source 14, 16 to the DC bus 12, the conversion circuit 18 associated with the power source may be operated in one of two modes—a first mode where the capacitor 34 of the respective conversion circuit 18 is discharged and a second mode where the capacitor 34 is charged. As shown in FIG. 3, the operational mode of the conversion circuit 18 is selectively controlled in order to maintain a voltage of the capacitor, $V_{C\_n}$, between an upper voltage threshold, $V_{T1}$, and a lower voltage threshold, $V_{T2}$. The operational mode of the conversion circuit 18 is achieved by controller 38 via the selection controlling/activation of the switches 20 and switch 36.

In the first operational mode of conversion circuit 18 where the capacitor 34 of the conversion circuit 18 is discharged, generally indicated at 46, both the DC power source 14, 16 and the capacitor 34 output power to the DC bus. In providing power from the capacitor 34, the state of switch modules 20 state can be selectively controlled to condition the power provided therefrom to a desired magnitude. The total power output from the DC power source 14, 16 and the capacitor 34 to the DC bus is thus provided as a conditioned power including voltage of a desired magnitude and direction. Operation of the conversion circuit 18 in the first mode, with the discharging of the capacitor 34, continues for a time, $T_{discharge}$, until the voltage of the capacitor, $V_{C\_n}$, decreases to the level of the lower voltage threshold, $V_{T2}$. When the voltage of the capacitor, $V_{C\_n}$, reaches the lower voltage threshold, $V_{T2}$, the conversion circuit 18 switches to the second operational mode.

In the second operational mode of conversion circuit 18 where the capacitor 34 of the conversion circuit 18 is charged, generally indicated as 48, the DC power sources 14, and 16 output power only to the capacitor 34 (with any power flow from the DC source to the DC link temporarily being stopped) in order to recharge the capacitor 34. Operation of the conversion circuit 18 in the second mode, with the charging of the capacitor 34, continues for a time, $T_{charge}$, until the voltage of the capacitor, $V_{C\_n}$, increases to the level of the upper voltage threshold, $V_{T1}$. When the voltage of the capacitor, $V_{C\_n}$, reaches the upper voltage threshold, $V_{T1}$, the conversion circuit 18 switches back to the first operational mode.

According to an exemplary embodiment, recharging of the capacitor 34 in the second operational mode may also be performed by the DC bus 12. That is, in addition to receiving recharging power from the DC power sources 14, and 16, the capacitor also receives recharging power from the DC bus 12. In order to enable the supply of recharging power from the DC bus 12 to the capacitor 34, the switch 36 in conversion circuit 18 is turned to the ON state. By supplementing the recharging power provided from the DC power source 14, 16 with the recharging power from the DC bus 12, the recharging time, $T_{charge}$, of the capacitor 34 can be decreased.

It is recognized that the discharging time, $T_{discharge}$, in the first operational mode and the charging time, $T_{charge}$, in the second operational mode can vary depending on a number of factors, including the voltage level of the respective DC power source 14, 16 and the voltage level of the DC bus 12. It is further recognized that the upper voltage threshold, $V_{T1}$, and the lower voltage threshold, $V_{T2}$, will vary/differ (between conversion circuits 18) based on the maximum output voltage of the respective DC power source 14, 16 and the voltage level of the DC bus 12.

Figure 4:
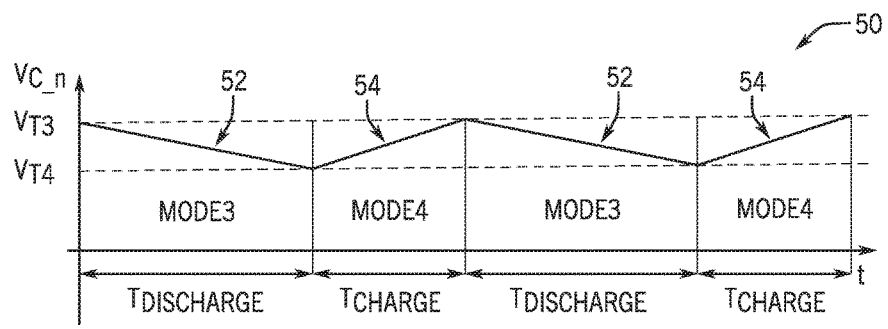
FIG. 4 illustrates a technique for selectively charging and discharging the DC link capacitor in the voltage conversion circuit of FIG. 1 when recharging a DC power source, according to an embodiment of the invention.

Referring now to FIG. 4, and with continued reference to FIG. 1, a technique 50 is provided—such as would be performed by controller 38—that illustrates operation of the conversion circuit 18 for providing a recharging of a DC power source from the DC bus 12 via conversion circuit 18 when the DC power source is a rechargeable device (e.g., the battery of DC power source 16), according to an additional embodiment of the invention. The technique 50 for charging the DC power source 16 includes the selective charging and discharging of capacitor 34 (i.e., DC link capacitor), and thus in charging the DC power source 16, the conversion circuit 18 associated with the power source may be operated in one of two modes—a third mode where the capacitor 34 of the conversion circuit 18 is discharged and a fourth mode where the capacitor 34 is charged. As shown in FIG. 4, the operational mode of the conversion circuit 18 is selectively controlled in order to maintain a voltage of the capacitor, $V_{C\_n}$, between an upper voltage threshold, $V_{T3}$, and a lower voltage threshold, $V_{T4}$. The operational mode of the conversion circuit 18 is achieved by controller 38 via the selection controlling/activation of the switches 20 and switch 36.

In the third operational mode of conversion circuit 18 where the capacitor 34 of the conversion circuit 18 is discharged, generally indicated at 52, power discharged from the capacitor 34 may be selectively combined with power from the DC bus 12 in order to charge the DC power source 16. If the voltage of the battery, $V_{\_Bat}$, is greater than the voltage on the DC bus, $V_{\_BUS}$ (i.e., $V_{\_Bat} > V_{\_BUS}$), then the DC power source 16 is recharged using both power from the capacitor 34 and power from the DC bus 12. If the voltage of the battery, $V_{\_Bat}$, is less than or equal to the voltage on the DC bus, $V_{\_BUS}$ (i.e., $V_{\_BUS} >= V_{\_Bat}$), then the DC power source 16 is recharged using power from only one of the capacitor 34 and power from the DC bus 12. According to one embodiment, power from the capacitor 34 and power from the DC bus 12 are alternately provided to the DC power supply 16 to recharge the power supply. According to another embodiment, only power from the capacitor 34 is provided to the DC power supply 16 to recharge the power supply. In each scenario, power is provided from the capacitor 34—alone or in combination with power from the DC bus 12—in a controlled fashion via selective operation of the of switch modules 20, such that a conditioned power is provided to DC power source 16. The operation of the conversion circuit 18 in the third mode, with the discharging of the capacitor 34, continues for a time, $T_{discharge}$, until the voltage of the capacitor, $V_{C\_n}$, decreases to the level of the lower voltage threshold, $V_{T4}$. When the voltage of the capacitor, $V_{C\_n}$, reaches the lower voltage threshold, $V_{T4}$, the conversion circuit 18 switches to the fourth operational mode.

In the fourth operational mode of conversion circuit 18 where the capacitor 34 of the conversion circuit 18 is charged, generally indicated at 54, the DC bus 12 provides power only to the capacitor 34 in order to recharge the capacitor 34. In order to enable the supply of recharging power from the DC bus 12 to the capacitor 34, the switch 36 in conversion circuit 18 is turned to the ON state. Operation of the conversion circuit 18 in the fourth mode, with the charging of the capacitor 34, continues for a time, $T_{charge}$, until the voltage of the capacitor, $V_{C\_n}$, increases to the level of the upper voltage threshold, $V_{T3}$. When the voltage of the capacitor, $V_{C\_n}$, reaches the upper voltage threshold, $V_{T3}$, the conversion circuit 18 switches back to the third operational mode.

According to one embodiment, recharging of the capacitor 34 in the fourth operational mode may also be performed by the DC power source 16. That is, in addition to receiving recharging power from the DC bus, the capacitor 34 also receives recharging power from the DC power source 16. By supplementing the recharging power provided from the DC bus 12 with the recharging power from the DC power supply 16, the recharging time, $T_{charge}$, of the capacitor 34 can be decreased.

It is recognized that the discharging time, $T_{discharge}$, in the third operational mode and the charging time, $T_{charge}$, in the fourth operational mode can vary depending on a number of factors, including the voltage level of the rechargeable DC power source 16 and the voltage level of the DC bus 12. It is further recognized that the upper voltage threshold, $V_{T3}$, and the lower voltage threshold, $V_{T4}$, can vary/differ based on the voltage of the DC power source 16 and the voltage level of the DC bus 12.

Figure 5:
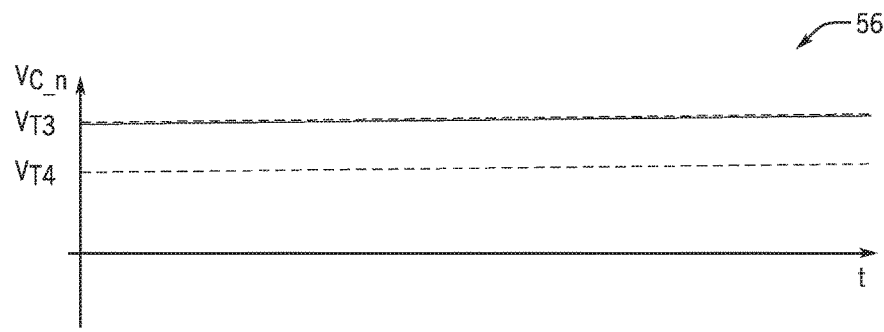
FIG. 5 illustrates a technique for recharging a DC power source via the DC bus and without use of the voltage conversion circuit, according to an embodiment of the invention.

Referring now to FIG. 5, and with continued reference to FIG. 1, a technique 56—such as would be performed by controller 38—for recharging the DC power source 16 (e.g., a battery) is illustrated where the voltage of the battery, $V_{\_Bat}$, is less than or equal to the voltage on the DC bus, $V_{\_BUS}$ (i.e., $V_{\_BUS} >= V_{\_Bat}$), and only power from the DC bus 12 is used to recharge the DC power source 16, according to an embodiment of the invention. In such an embodiment, the arrangement/set of switches 22 in the conversion circuit 18 may be bypassed—such as by turning off switches $S_{na}$ and $S_{nc}$ or switches $S_{nb}$ and $S_{nd}$ (FIG. 1)—such that the DC bus 12 recharges the DC power source 16 automatically without the performing of any additional controls.

Accordingly, and as seen in FIG. 5, no charging/discharging of the capacitor 34 is performed that would vary the voltage thereof between upper voltage threshold, $V_{T3}$, and a lower voltage threshold, $V_{T4}$. The recharging of the DC power source 16 is performed until the power source 16 is fully charged, such that the value of voltage, $V_{adj\_n}$ (FIG. 1), is defined as:

$$V_{adj\_n} = V_{BUS} - V_{\_Bat} \quad [\text{Eqn. 1}].$$

Figure 6:
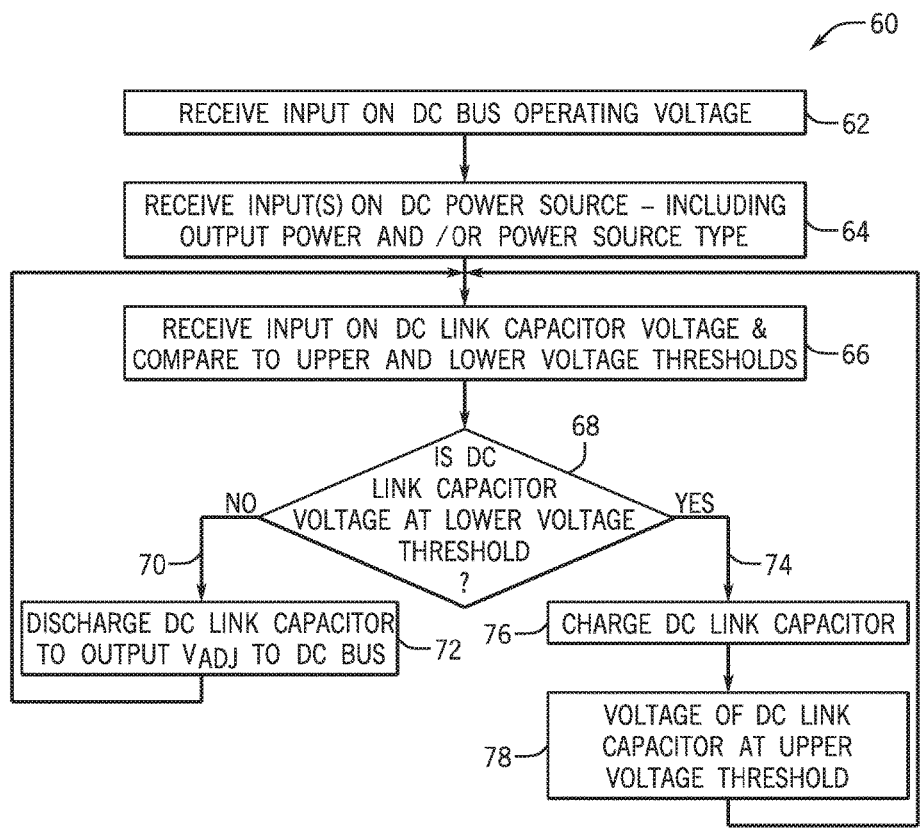
FIG. 6 is a flowchart illustrating a technique for controlling operation of a voltage conversion circuit in a DC power distribution system when outputting power from a DC power source to a DC bus, according to an embodiment of the invention.

Referring now to FIG. 6, and with continued reference to FIG. 1, an overall technique 60 for operating conversion circuits 18 included in the DC power distribution system 10 for providing power from hybrid DC power sources 14, 16 to the DC bus 12 is shown according to an embodiment of the invention. The technique begins at STEP 62 wherein the controller 38 of the conversion circuit 18 receives an input regarding the voltage at which the DC bus 12 is operating. Next, at STEP 64, the controller 38 of the conversion circuit 18 receives one or more inputs related to the DC power source 14, 16 which the conversion circuit 18 and its respective controller 38 is operationally connected to. The one or more inputs received by the controller 38 at STEP 64 can include an input such as the output power (voltage and/or current) of the DC power source 14, 16, as well as an input regarding the type of DC power source to which the conversion circuit 18 is coupled, such as whether the power source is a unidirectional or bidirectional power source, for example.

In a next step of technique 60, the controller 38 of the conversion circuit 18 receives an input related to the voltage level of the DC link capacitor 34 at STEP 66. At STEP 66, the controller 38 also compares the voltage level of the DC link capacitor 34, $V_{C\_n}$, to an upper voltage threshold, $V_{T1}$, and a lower voltage threshold, $V_{T2}$ between which the capacitor 34 is to operate. A determination is then made at STEP 68 as to whether the voltage level of the DC link capacitor 34, $V_{C\_n}$, is at the lower voltage threshold, $V_{T2}$. If the voltage level of the DC link capacitor 34, $V_{C\_n}$, is not at the lower voltage threshold, $V_{T2}$, as indicated at 70, then the technique 60 continues at STEP 72 by causing the discharging of the DC link capacitor 34 to provide a voltage output from the conversion circuit 18, $V_{adj}$. In discharging the DC link capacitor 34, a switching pattern for the arrangement 22 of switches 20 is determined based on the inputs received at STEPS 62 and 64 and the switches are actuated according to the determined switching pattern (such as by transmitting gate drive signals to the IGBTs of the switches). In determining the switching pattern to be implemented, the controller 38 determines a direction (positive or negative) and magnitude of a voltage to be output from the conversion circuit 18, $V_{adj}$, that is satisfactory for transmission to the DC bus 12. Once the desired $V_{adj}$ is determined by the controller 38, the controller 38 can determine a switching pattern for controlling the state of switches 20 that will generate this $V_{adj}$ and actuate the switches 20 to cause the DC link capacitor 34 to be discharged so as to achieve the voltage $V_{adj}$. Accordingly, both the DC power source 14, 16 and the capacitor 34 output power to the DC bus 12.

Conversely, if the voltage level of the DC link capacitor 34, $V_{C\_n}$, is at the lower voltage threshold, $V_{T2}$, as indicated at 74, then the technique 60 continues at STEP 76 by charging the DC link capacitor 34. In charging the DC link capacitor 34, a switching pattern for the arrangement 22 of switches 20 is again determined based on the inputs received at STEPS 62 and 64 and the switches are actuated according to the determined switching pattern so as to cause the charging of the DC link capacitor 34 from the respective DC power source 14, 16. The controller 38 thereby causes the DC power source 14, 16 to output power only to the capacitor 34 in order to recharge the capacitor 34. According to one embodiment, the controller 38 also actuates the charging switch 36 to an ON state to provide recharging power from the DC bus 12 to the DC link capacitor 34. The charging of the capacitor at STEP 76 continues until the voltage of the capacitor, $V_{C\_n}$, increases to the level of the upper voltage threshold, $V_{T1}$, as indicated at STEP 78, with the technique 60 then looping back to STEP 66 before continuing.

Figure 7:
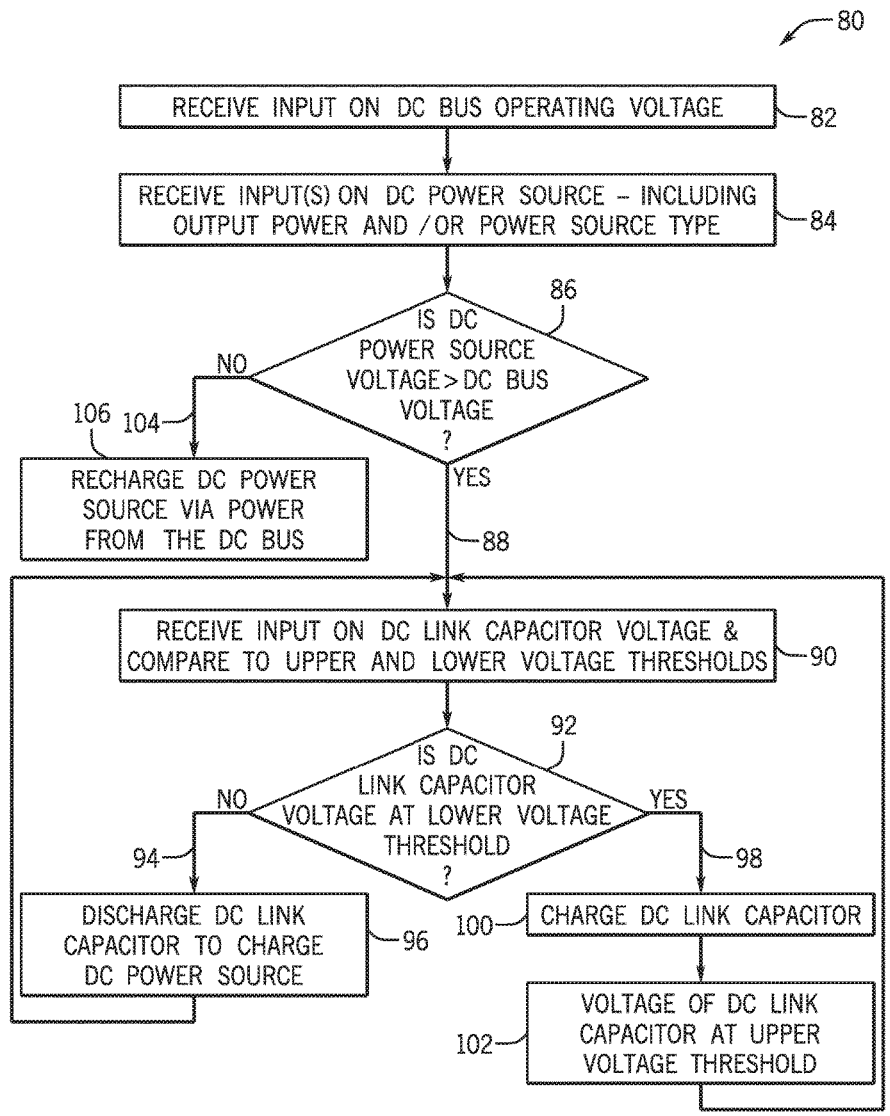
FIG. 7 is a flowchart illustrating a technique for controlling operation of a voltage conversion circuit in a DC power distribution system when recharging a DC power source, according to an embodiment of the invention.

Referring now to FIG. 7, and with continued reference to FIG. 1, an overall technique 80 for operating a conversion circuit 18 included in the DC power distribution system 10 for providing recharging power to a rechargeable DC power source—such as the battery of DC power source 16—is shown according to an embodiment of the invention. The technique begins at STEP 82 wherein the controller 38 of the conversion circuit 18 receives an input regarding the voltage at which the DC bus 12 is operating. Next, at STEP 84, the controller 38 of the conversion circuit 18 receives one or more inputs related to the DC power source 14, 16 which the conversion circuit 18 and its respective controller 38 is operationally connected to. The one or more inputs received by the controller 38 at STEP 84 can include an input such as the output power (voltage and/or current) of the DC power source 14, 16, as well as an input regarding the type of DC power source to which the conversion circuit 18 is coupled, and whether the power source is a unidirectional or bidirectional power source, for example.

In a next step of technique 80, a determination is made at STEP 86 as to whether a voltage of the DC power source, $V_{\_Bat}$, is greater than the voltage on the DC bus, $V_{\_BUS}$ (i.e., $V_{\_Bat} > V_{\_BUS}$). If the voltage of the DC power source, $V_{\_Bat}$, is greater than the voltage on the DC bus, $V_{\_BUS}$, as indicated at 88, then the technique 80 continues at STEP 90—where the controller 38 receives an input related to the voltage level of the DC link capacitor 34. At STEP 90, the controller 38 also compares the voltage level of the DC link capacitor 34, $V_{C\_n}$, to an upper voltage threshold, $V_{T3}$, and a lower voltage threshold, $V_{T4}$ between which the capacitor 34 is to operate. A determination is then made at STEP 92 as to whether the voltage level of the DC link capacitor 34, $V_{C\_n}$, is at the lower voltage threshold, $V_{T4}$.

If the voltage level of the DC link capacitor 34, $V_{C\_n}$, is not at the lower voltage threshold, $V_{T2}$, as indicated at 94, then the technique 80 continues at STEP 96 by causing the discharging of the DC link capacitor 34 to provide a voltage output from the conversion circuit 18, $V_{adj}$. In discharging the DC link capacitor 34, a switching pattern for the arrangement 22 of switches 20 is determined based on the inputs received at STEPS 82 and 84 and the switches are actuated according to the determined switching pattern (such as by transmitting gate drive signals to the IGBT switches). In determining the switching pattern to be implemented, the controller 38 determines a direction (positive or negative) and magnitude of a voltage to be output from the conversion circuit 18, $V_{adj}$. Once the desired $V_{adj}$ is determined by the controller 38, the controller 38 can determine a switching pattern for controlling the state of switches 20 that will generate this $V_{adj}$ and actuate the switches 20 to cause the DC link capacitor 34 to be discharged so as to achieve the voltage $V_{adj}$. Accordingly, both the DC bus 12 and the DC link capacitor 34 provide power to recharge the DC power source 16.

Conversely, if the voltage level of the DC link capacitor 34, $V_{C\_n}$, is at the lower voltage threshold, $V_{T4}$, as indicated at 98, then the technique 80 continues at STEP 100 by charging the DC link capacitor 34. In charging the DC link capacitor 34, the controller 38 actuates the charging switch 36 to an ON state to provide recharging power from the DC bus 12 to the DC link capacitor 34. According to one embodiment, power is also provided from DC power source 16 to charge the DC link capacitor 34, with a switching pattern for the arrangement 22 of switches 20 being determined based on the inputs received at STEPS 82 and 84 and the switches being actuated according to the determined switching pattern so as to cause the charging of the DC link capacitor 34 from the respective DC power source 16. The charging of the capacitor at STEP 100 continues until the voltage of the capacitor, $V_{C\_n}$, increases to the level of the upper voltage threshold, $V_{T3}$, as indicated at STEP 102, with the technique 80 then looping back to STEP 94 before continuing.

Referring still to FIG. 7, if it is determined at STEP 86 that the voltage of the DC power source, $V_{\_Bat}$, is less than or equal to the voltage on the DC bus, $V_{\_BUS}$ (i.e., $V_{\_BUS} >= V_{\_Bat}$), as indicated at 104, then the technique 80 continues at STEP 106 by recharging the DC power source 16 using only power from the DC bus 12. In doing so, the arrangement/set of switches 22 in the conversion circuit 18 may be bypassed—such as by turning off switches $S_{na}$ and $S_{nc}$ or switches $S_{nb}$ and $S_{nd}$ (FIG. 1)—such that the DC bus 12 recharges the DC power source 16 automatically without the performing of any additional controls.

Beneficially, embodiments of the invention provide a standardized and flexible power conversion/interface circuit useable in a power distribution system having hybrid DC power sources. The conversion circuit enables the use of different energy sources and links those energy sources for use in a system by providing a controllable and adjustable voltage output from the conversion circuit based on the requirements of DC bus voltage (or the requirements of the DC power source, if charging a rechargeable DC power source). By enabling the use of standardized and flexible conversion circuits, a flexible, highly efficient, bi-directional power flow may be provided in a DC power distribution system at a low cost.

A technical contribution of the invention is that it provides a controller implemented technique for conditioning the DC power received from respective DC power sources in order to output a voltage to a common DC bus having a desired magnitude and direction. A controller associated with a respective switching circuit controls the switching circuit to provide a desired voltage adjustment to a DC voltage of an associated DC power source, based on a plurality of inputs received by the controller.

Therefore, according to one embodiment of the invention, a DC power distribution system includes a DC bus and a plurality of DC power sources connected to the DC bus each configured to generate an output power for transmission to the DC bus, wherein the plurality of DC power sources include at least two different types of DC power sources having differing voltage terminal output characteristics. The DC power distribution system also includes a power conversion circuit coupled to each of the plurality of DC power sources to selectively condition the output power generated by its respective DC power source to a DC bus voltage, with each power conversion circuit having a standardized construction so as to be identical to each of the other power conversion circuits. Each power conversion circuit further comprises a switch arrangement comprising a plurality of switches operable in an open state and a closed state, a plurality of capacitors arranged to provide a charge balancing in the power conversion circuit, the plurality of capacitors including a DC link capacitor, and a controller in operable communication with the switch arrangement, the controller being programmed to receive a first input comprising a DC bus voltage present on the DC bus, receive a second input comprising at least one parameter related to operation of the DC power source to which the respective power conversion circuit is coupled, determine an adjustable voltage to be output from the conversion circuit to the DC bus based on the received first and second inputs, and selectively control operation of each of the plurality of switches in the switch arrangement in order to generate the determined adjustable voltage.

According to another aspect of the invention, a method of conditioning an output power of hybrid DC power sources in a power distribution system includes generating a first output power from a first DC power source and generating a second output power from a second DC power source, the second DC power source being a different power source than the first DC power source such that the second output power has a different voltage characteristic than the first output power. The method also includes performing a voltage conversion of the first output power by way of a first conversion circuit so as to generate a first modified voltage and performing a voltage conversion of the second output power by way of a second conversion circuit so as to generate a second modified voltage, the second conversion circuit having an identical construction as the first conversion circuit. The method further includes providing the first and second modified voltages to a common DC bus to which the first and second DC power sources and first and second conversion circuits are electrically coupled, wherein performing the voltage conversion of the first and second output powers by way of the first and second conversion circuits each further comprises receiving a first input comprising a DC bus voltage present on the DC bus, receiving a second input comprising at least one parameter related to operation of the DC power source to which the respective power conversion circuit is coupled, determining a modified voltage to be output from the conversion circuit to the DC bus based on the received first and second inputs, and controlling operation of the respective conversion circuit in order to generate the determined modified voltage.

According to yet another aspect of the invention, a DC power distribution system includes a DC bus and a plurality of DC power sources connected to the DC bus and configured to generate an output power for transmission to the DC bus, wherein the plurality of DC power sources include at least two different types of DC power sources having differing voltage terminal output characteristics. The DC power distribution system also includes a voltage conversion circuit operatively coupled to each of the plurality of DC power sources to selectively condition the DC power generated by its respective DC power source or condition a DC power provided to its respective DC power source to provide recharging thereto. Each of the voltage conversion circuits has an identical construction and further includes a switch arrangement comprising a plurality of switches operable in an open state and a closed state, a plurality of capacitors arranged to provide a charge balancing in the power conversion circuit, the plurality of capacitors including a DC link capacitor, and a controller in operable communication with the switch arrangement. The controller is programmed to receive a first input comprising a DC bus voltage present on the DC bus, receive a second input comprising at least one parameter related to operation of the DC power source to which the respective power conversion circuit is coupled, and determine an adjustable voltage to be output from the conversion circuit to the DC bus or to the DC power source based on the received first and second inputs, the adjustable voltage comprising a positive or negative voltage of desired magnitude. The controller is further programmed to selectively control operation of each of the plurality of switches in the switch arrangement in order to generate the determined adjustable voltage.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A DC power distribution system comprising:
a DC bus;

a plurality of DC power sources connected to the DC bus each configured to generate an output power for transmission to the DC bus, wherein the plurality of DC power sources include at least two different types of DC power sources having differing voltage terminal output characteristics;

a power conversion circuit coupled to each of the plurality of DC power sources to selectively condition the output power generated by its respective DC power source to a DC bus voltage, with each power conversion circuit having a standardized construction so as to be identical to each of the other power conversion circuits;

wherein each power conversion circuit comprises:
- a switch arrangement comprising a plurality of switches operable in an open state and a closed state;
- a plurality of capacitors arranged to provide a charge balancing in the power conversion circuit, the plurality of capacitors including a DC link capacitor;
- a charging switch operable to selectively electrically couple and decouple the power conversion circuit to the DC bus; and
- a controller in operable communication with the switch arrangement, the controller being programmed to:
  - receive a first input comprising a DC bus voltage present on the DC bus;
  - receive a second input comprising at least one parameter related to operation of the DC power source to which the respective power conversion circuit is coupled;
  - determine an adjustable voltage to be output from the conversion circuit to the DC bus based on the received first and second inputs; and
  - selectively control operation of each of the plurality of switches in the switch arrangement in order to generate the determined adjustable voltage.

2. The DC power distribution system of claim 1 wherein, in generating the determined adjustable voltage, the controller is further programmed to cause the DC link capacitor to be selectively charged during a capacitor charging mode and discharged during a capacitor discharging mode.

3. The DC power distribution system of claim 2 wherein the controller is further programmed to:
receive an input on a voltage of the DC link capacitor;
compare the voltage of the DC link capacitor to an upper voltage threshold value and a lower threshold voltage value; and
cause the DC link capacitor to be selectively charged and discharged based on the comparison of the voltage of the DC link capacitor to the upper voltage threshold value and the lower threshold voltage value.

4. The DC power distribution system of claim 3 wherein the controller is further programmed to set the upper voltage threshold value and the lower threshold voltage value based on the DC bus voltage and on a maximum voltage of the respective DC power source.

5. The DC power distribution system of claim 3 wherein the DC link capacitor is charged by the respective DC power source during the capacitor charging mode.

6. The DC power distribution system of claim 5 wherein the controller is further programmed to switch the charging switch to an ON state when in the capacitor charging mode, such that the DC link capacitor is recharged by the DC bus and the respective DC power source.

7. The DC power distribution system of claim 1 wherein one of the plurality of DC power sources comprises a battery, and wherein the power conversion circuit coupled to the battery selectively conditions a recharging power provided to recharge the battery.

8. The DC power distribution system of claim 7 wherein the controller is further programmed to cause the DC link capacitor to be selectively charged and discharged during recharging of the battery.

9. The DC power distribution system of claim 8 wherein, in selectively charging and discharging the DC link capacitor, the controller is further programmed to:
receive an input on a voltage of the DC link capacitor;
compare the voltage of the DC link capacitor to an upper voltage threshold value and a lower threshold voltage value; and
cause the DC link capacitor to be selectively charged and discharged based on the comparison of the voltage of the DC link capacitor to the upper voltage threshold value and the lower threshold voltage value.

10. The DC power distribution system of claim 1 wherein the switch arrangement comprises a pair of half-bridge circuits.

11. The DC power distribution system of claim 10 wherein each of the power conversion circuits further comprises an inductor connected to a respective half-bridge circuit, the inductors providing smoothing in the power conversion circuit, and wherein the inductor may connect to either of the half-bridge circuits to further simplify the half-bridge circuit.

12. The DC power distribution system of claim 1 wherein the second input received by the controller comprises at least one of an output voltage and current of the DC power source to which the respective power conversion circuit is coupled and a type of DC power source to which the respective power conversion circuit is coupled.

13. A method of conditioning an output power of hybrid DC power sources in a power distribution system, the method comprising:
generating a first output power from a first DC power source;
generating a second output power from a second DC power source, the second DC power source being a different power source than the first DC power source such that the second output power has a different voltage characteristic than the first output power;
performing a voltage conversion of the first output power by way of a first conversion circuit so as to generate a first modified voltage;
performing a voltage conversion of the second output power by way of a second conversion circuit so as to generate a second modified voltage, the second conversion circuit having an identical construction as the first conversion circuit;
providing the first and second modified voltages to a common DC bus to which the first and second DC power sources and first and second conversion circuits are electrically coupled;
wherein performing the voltage conversion of the first and second output powers by way of the first and second conversion circuits each further comprises:
receiving a first input comprising a DC bus voltage present on the DC bus;
receiving a second input comprising at least one parameter related to operation of the DC power source to which the respective power conversion circuit is coupled;

determining a modified voltage to be output from the conversion circuit to the DC bus based on the received first and second inputs; and controlling operation of the respective conversion circuit in order to generate the determined modified voltage; and selectively coupling and decoupling the first and second conversion circuits to the DC bus via switching of a charging switch in each of the first and second conversion circuits.

14. The method of claim 13 wherein the second input comprises at least one of an output voltage and current of the respective first or second DC power source to which the respective first or second conversion circuit is coupled and a type of the respective first or second DC power source to which the respective the first or second power conversion circuit is coupled.

15. The method of claim 13 wherein controlling operation of a respective conversion circuit comprises controlling a switch arrangement in the conversion circuit to selectively charge and discharge a DC link capacitor in the conversion circuit.

16. The method of claim 15 wherein selectively charging and discharging the DC link capacitor comprises:
determining a voltage of the DC link capacitor;
comparing the voltage of the DC link capacitor to an upper voltage threshold value and a lower threshold voltage value; and
causing the DC link capacitor to be selectively charged and discharged based on the comparison of the voltage of the DC link capacitor to the upper voltage threshold value and the lower threshold voltage value.

17. The method of claim 15 wherein, in charging the DC link capacitor, the charging switch is closed such that charging power is provided from the DC bus to the DC link capacitor.

18. A DC power distribution system comprising:
a DC bus;
a plurality of DC power sources connected to the DC bus and configured to generate an output power for transmission to the DC bus, wherein the plurality of DC power sources include at least two different types of DC power sources having differing voltage terminal output characteristics;
a voltage conversion circuit operatively coupled to each of the plurality of DC power sources to selectively condition the DC power generated by its respective DC power source and condition a DC power provided to its respective DC power source to provide recharging thereto, wherein each of the voltage conversion circuits has an identical construction and comprises:
a switch arrangement comprising a plurality of switches operable in an open state and a closed state;
a plurality of capacitors arranged to provide a charge balancing in the power conversion circuit, the plurality of capacitors including a DC link capacitor; and a controller in operable communication with the switch arrangement, the controller being programmed to:
receive a first input comprising a DC bus voltage present on the DC bus;
receive a second input comprising at least one parameter related to operation of the DC power source to which the respective power conversion circuit is coupled;
determine an adjustable voltage to be output from the conversion circuit to the DC bus or to the DC power source based on the received first and second inputs, the adjustable voltage comprising a positive or negative voltage of desired magnitude; and
selectively control operation of each of the plurality of switches in the switch arrangement in order to generate the determined adjustable voltage.

19. The DC power distribution system of claim 18 wherein, when the voltage conversion circuit selectively conditions the DC power generated by its respective DC power source, the controller is programmed to cause the DC link capacitor to be selectively charged during a capacitor charging mode and discharged during a capacitor discharging mode; and
wherein, in causing the DC link capacitor to be selectively charged and discharged, the controller is further programmed to:
receive an input on a voltage of the DC link capacitor;
compare the voltage of the DC link capacitor to an upper voltage threshold value and a lower threshold voltage value; and
cause the DC link capacitor to be selectively charged and discharged based on the comparison of the voltage of the DC link capacitor to the upper voltage threshold value and the lower threshold voltage value.

20. The DC power distribution system of claim 18 wherein, when the voltage conversion circuit conditions DC power provided to its respective DC power source to provide recharging thereto, the controller is programmed to cause the DC link capacitor to be selectively charged and discharged during recharging of the DC power source;
wherein, in causing the DC link capacitor to be selectively discharged, the controller is further programmed to:
provide recharging power to the DC power source from each of the DC link capacitor and the DC bus; or
provide recharging power to the DC power source from only one of the DC link capacitor or the DC bus at a given time; and
wherein, in causing the DC link capacitor to be selectively charged, the controller is further programmed to provide charging power to the DC link capacitor from at least the DC bus.

* * * * *